United States Patent
Matsumoto

(10) Patent No.: US 9,806,533 B2
(45) Date of Patent: Oct. 31, 2017

(54) POWER TRANSMITTING APPARATUS, POWER RECEIVING APPARATUS, POWER TRANSMITTING METHOD, POWER RECEIVING METHOD, AND PROGRAM

(71) Applicant: CANON KABUSHIKI KAISHA, Tokyo (JP)

(72) Inventor: Akihiro Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 686 days.

(21) Appl. No.: 14/223,806

(22) Filed: Mar. 24, 2014

(65) Prior Publication Data

US 2014/0292093 A1    Oct. 2, 2014

(30) Foreign Application Priority Data

Mar. 26, 2013    (JP) .................................. 2013-064084

(51) Int. Cl.
*H01F 27/42* (2006.01)
*H02J 5/00* (2016.01)
*H02J 50/12* (2016.01)
*H04B 5/00* (2006.01)

(52) U.S. Cl.
CPC .............. *H02J 5/005* (2013.01); *H02J 50/12* (2016.02); *H04B 5/0037* (2013.01); *H04B 5/0093* (2013.01)

(58) Field of Classification Search
CPC ............ H02J 50/40; H02J 50/80; H02J 50/12
See application file for complete search history.

(56) References Cited

U.S. PATENT DOCUMENTS

2011/0127951 A1*    6/2011    Walley .................... H02J 7/025
                                                          320/108

FOREIGN PATENT DOCUMENTS

| JP | 2009-118320 A | 5/2009 |
|---|---|---|
| JP | 2011-166883 A | 8/2011 |
| JP | 2011154435 A | 8/2011 |
| JP | 2012-029471 A | 2/2012 |
| JP | 2012-109922 A | 6/2012 |
| WO | 2010116441 A1 | 10/2010 |

* cited by examiner

*Primary Examiner* — Daniel Cavallari
(74) *Attorney, Agent, or Firm* — Canon U.S.A., Inc. IP Division

(57) ABSTRACT

A power transmitting apparatus for transmitting the power to a power receiving apparatus includes a power transmitting unit configured to wirelessly transmit the power, a receiving unit configured to receive from other power transmitting apparatuses currently transmitting the power the information about the resonance frequencies used for the current power transmission, and a resonance frequency determination unit configured to, based on the resonance frequency information, determine a resonance frequency to be used for power transmission by the power transmitting unit.

1 Claim, 17 Drawing Sheets

FIG.4A
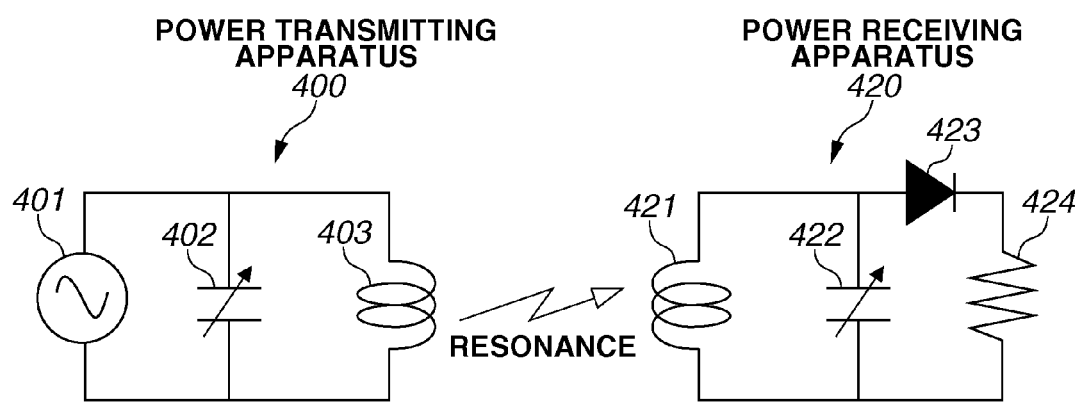
FIG.4B
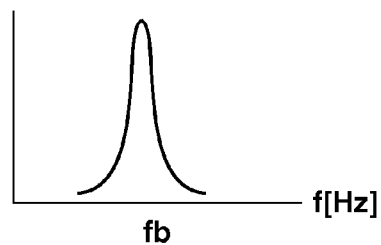
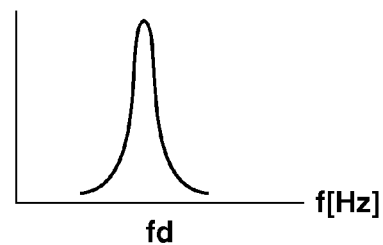

FIG.10

| SOURCE ADDRESS | PARAMETERS | |
|---|---|---|
| ADDRESS A | PARAMETERS 1 | PARAMETERS 2 |
| ADDRESS B | PARAMETERS 1 | PARAMETERS 2 |

POWER TRANSMITTING APPARATUS, POWER RECEIVING APPARATUS, POWER TRANSMITTING METHOD, POWER RECEIVING METHOD, AND PROGRAM

BACKGROUND OF THE INVENTION

Field of the Invention

The present invention relates to a power transmitting apparatus, a power receiving apparatus, a power transmitting method, a power receiving method, and a program.

Description of the Related Art

In 2010, the "Qi Standard" was established by the Wireless Power Consortium (WPC) for mobile apparatuses having a power of 5 watts or less. Since then, non-contact power supply apparatuses for smart phones and mobile phones have been spreading. Most of non-contact power supply apparatuses currently on the market are of the electromagnetic induction type having a power transmission distance of several millimeters to several centimeters.

In late years researches have been rapidly progressing on the magnetic field resonance method for achieving power transmission over a distance of several centimeters to several meters, as a non-contact power supply method other than the electromagnetic induction method. The magnetic field resonance method is a method for transmitting the power through magnetic field resonance of a resonator composed of a coil and a capacitor embedded on each of the power transmitting and the power receiving sides. The power receiving side converts a high frequency generated by resonance into a direct current (DC) signal by using a rectification circuit, and uses the DC signal as the power.

There are reported a technique for transmitting a 60-watt power over a 2-meter distance by using the magnetic resonance method, and a development of a wireless power supply system for driving an electronic apparatus at a 50-centimeter distance by using a 60-watt power. In connection with the magnetic field resonance method, there is expected a development of a product having a new concept of extending the power transmission distance up to about 10 meters in the future, and wirelessly supplying the power to office and home electric appliances.

One of technical problems in using the magnetic field resonance method is that, when power supply ranges of a plurality of power transmitting apparatuses overlap with each other, a certain power transmitting apparatus may supply the power to an unintended device. In this case, the following problems may possibly occur.
(1) The efficiency of power supply to a correct device decreases.
(2) Supplying a high power to an unintended device damages the device.
(3) When the power is charged, the power is intentionally or unintentionally stolen.

To solve the above-described problems, there is a proposed an apparatus having a communication unit and a circuit capable of dynamically changing the resonance frequency between a power transmitting apparatus and a power receiving apparatus (see, for example, Japanese Patent Application Laid-Open No. 2011-166883). The present apparatus changes a resonance frequency fn for power supply to a device, to frequencies f0, f1, f2, f0, at suitable intervals on a time sharing basis. This technique enables reducing the possibility of unintended power supply to $1/3$ below (generally to 1/n or below) even if another device having the resonance frequency f0 is placed in the vicinity of the apparatus.

However, in the technique discussed in Japanese Patent Application Laid-Open No. 2011-166883, the power transmitting apparatus needs to repetitively change the resonance frequency in power transmission to one power receiving apparatus. Therefore, there has been a problem that a mechanism for changing the resonance frequency becomes complicated resulting in complicated processing. Moreover, there has been a problem that unintended power supply may occur.

SUMMARY OF THE INVENTION

The present invention is directed to achieving suitable power transmission to a power receiving apparatus as a power transmission target through simple processing.

According to an aspect of the present invention, a power transmitting apparatus for transmitting the power to a power receiving apparatus includes a power transmitting unit configured to wirelessly transmit the power, a receiving unit configured to receive from other power transmitting apparatuses currently transmitting the power the information about the resonance frequencies used for the current power transmission, and a resonance frequency determination unit configured to, based on the resonance frequency information, determine a resonance frequency to be used for power transmission by the power transmitting unit.

Further features of the present invention will become apparent from the following description of exemplary embodiments with reference to the attached drawings.

BRIEF DESCRIPTION OF THE DRAWINGS

FIGS. 4A and 4B illustrate the nuclear magnetic resonance method.
FIG. 10 illustrates an example of a list table.

DESCRIPTION OF THE EMBODIMENTS

Various exemplary embodiments, features, and aspects of the invention will be described in detail below with reference to the drawings.

Figure 1:
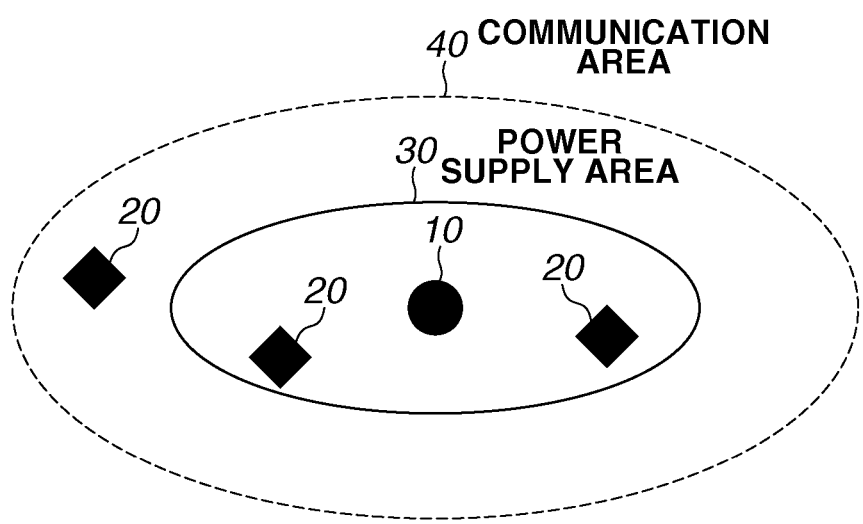
FIG. 1 illustrates a wireless power supply system.

FIG. 1 illustrates a wireless power supply system. The wireless power supply system includes a power transmitting apparatus 10 and a plurality of power receiving apparatuses 20. Although only one power transmitting apparatus 10 is illustrated in FIG. 1, the wireless power supply system is configured to include a plurality of power transmitting apparatuses 10. Each power transmitting apparatus 10 wirelessly supplies the power to each power receiving apparatus 20. The power transmitting apparatus 10 also performs data communication with the power receiving apparatus 20 which is required for power supply from the power transmitting apparatus 10 to the power receiving apparatus 20. The power receiving apparatus 20 wirelessly receives the power supplied from the power transmitting apparatus 10. The power receiving apparatus 20 performs data communication with the power transmitting apparatus 10 which is required for power supply from the power transmitting apparatus 10 to the power receiving apparatus 20.

A power supply area 30 illustrated in FIG. 1 is an area in which the power can be supplied from the power transmitting apparatus 10 to the power receiving apparatuses 20. A communication area 40 is an area in which data communication can be performed between the power transmitting apparatus 10 and the power receiving apparatuses 20.

A relation between the power supply area 30 and the communication area 40 will be described below. The communication area 40 has a larger area than the power supply area 30. Specifically, the power supply area 30 is included in the communication area 40. As illustrated in FIG. 1, when a plurality of power receiving apparatuses 20 exists in the power supply area 30, the power transmitting apparatus 10 can wirelessly supply in parallel the power to the plurality of power receiving apparatuses 20.

Referring to FIG. 1, although the power supply area 30 (dotted line) and the communication area 40 (solid line) are two-dimensionally drawn for convenience sake, they are actually three-dimensionally formed.

Figure 2:
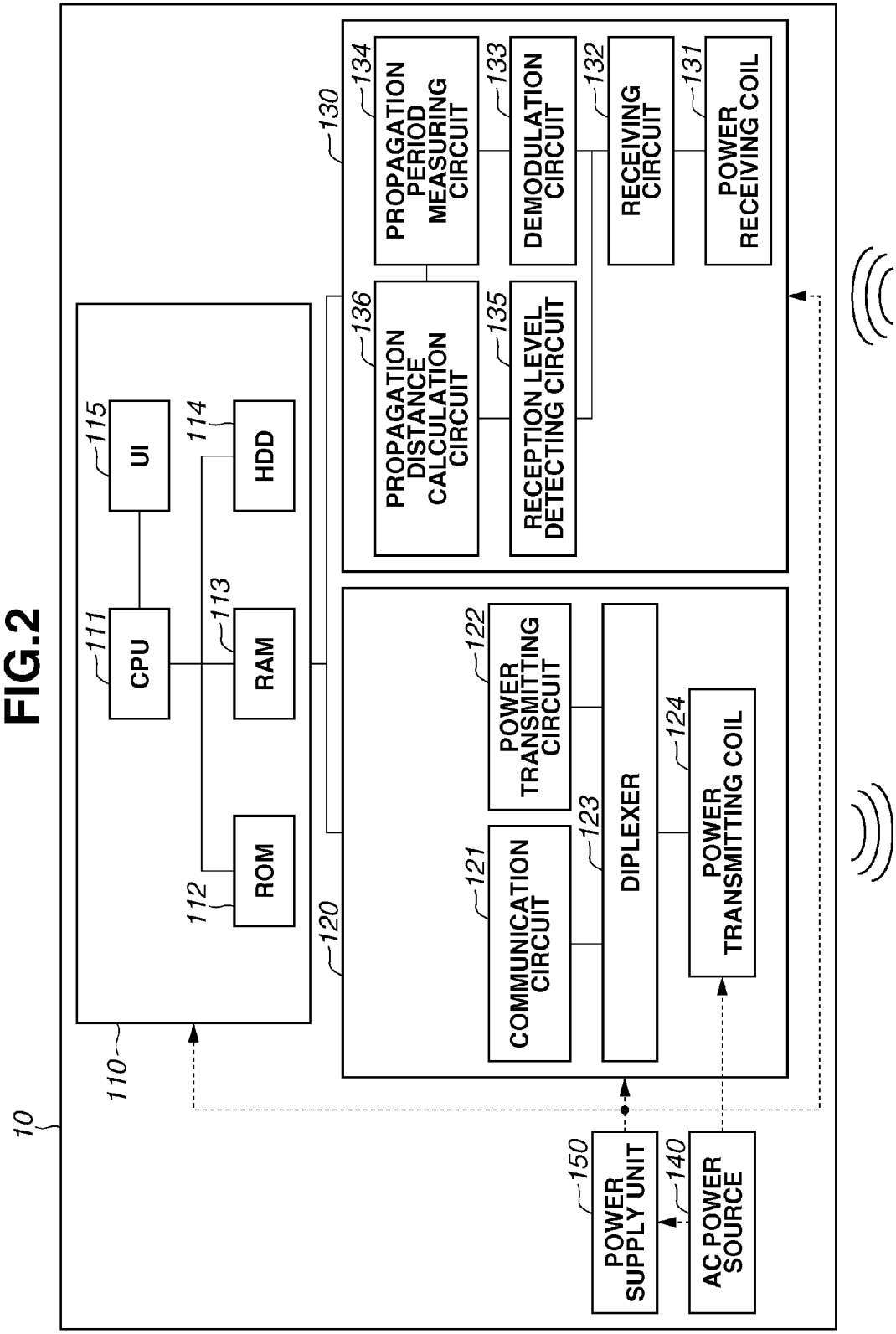
FIG. 2 illustrates a power transmitting apparatus.

FIG. 2 illustrates a configuration of the power transmitting apparatus 10. Referring to FIG. 2, data exchange paths are illustrated by solid lines, and power supply paths are illustrated by dotted lines. The power transmitting apparatus 10 includes a control unit 110, a wireless transmission unit 120, a wireless reception unit 130, an alternating current (AC) power source 140, and a power supply unit 150.

The control unit 110 controls the power transmitting apparatus 10. The control unit 110 includes a central processing unit (CPU) 111, a read-only memory (ROM) 112, a random access memory (RAM) 113, a hard disk drive (HDD) 114, and a user interface (UI) 115. The control unit 110 is connected with the wireless transmission unit 120 and the wireless reception unit 130 via internal buses.

The CPU 111 processes various data, and controls the power transmitting apparatus 10. The ROM 112 is a nonvolatile storage medium for storing a boot program, etc. used by the CPU 111. The RAM 113 is a volatile storage medium for temporarily storing data and programs used by the CPU 111. The HDD 114 is a nonvolatile storage medium for storing an operating system (OS) and applications used by the CPU 111. The UI 115 displays various information to the user, and receives various instructions from the user.

The wireless transmission unit 120 wirelessly transmits the power to the power receiving apparatus 20. The wireless transmission unit 120 includes a communication circuit 121, a power transmitting circuit 122, a diplexer 123, and a power transmitting coil 124. The communication circuit 121 generates a modulation signal for communication. The power transmitting circuit 122 generates a modulation signal for power transmission.

The diplexer 123 combines the modulation signal generated by the communication circuit 121 with the modulation signal generated by the power transmitting circuit 122. The power transmitting coil 124 transmits the modulation signal combined by the diplexer 123 to the power receiving apparatus 20.

The wireless reception unit 130 receives data from the power receiving apparatus 20. The wireless reception unit 130 includes a receiving coil 131, a receiving circuit 132, a demodulation circuit 133, a propagation period measuring circuit 134, a reception level detecting circuit 135, and a propagation distance calculation circuit 136.

The receiving coil 131 receives the modulation signal for communication from the power receiving apparatus 20. The receiving circuit 132 receives the modulation signal received by the receiving coil 131. The demodulation circuit 133 demodulates the modulation signal received by the receiving circuit 132. Based on the signal modulated by the demodulation circuit 133, the propagation period measuring circuit 134 measures the propagation period until a wireless signal transmitted from the power receiving apparatus 20 reaches the power transmitting apparatus 10.

The reception level detecting circuit 135 receives an analog reception signal from the receiving coil 131, and detects the reception level (for example, the power reception level) of the wireless signal. With reference to the propagation time received from the propagation time measuring circuit 134 and the level received from the reception level detecting circuit 135, the propagation distance calculation circuit 136 calculates the distances between the relevant power transmitting apparatus 10 and other apparatuses (other power transmitting apparatuses 10 and power receiving apparatuses 20).

The AC power source 140 supplies an AC voltage to the power transmitting coil 124 and the power supply unit 150. The power supply unit 150 converts the AC voltage supplied by the AC power source 140 into a DC voltage, and supplies the DC voltage to the control unit 110, the wireless transmission unit 120, and the wireless reception unit 130.

The function and processing of the power transmitting apparatus 10 described below are implemented when the CPU 111 reads a relevant program stored in the ROM 112 or the HDD 114, and executes it.

Figure 3:
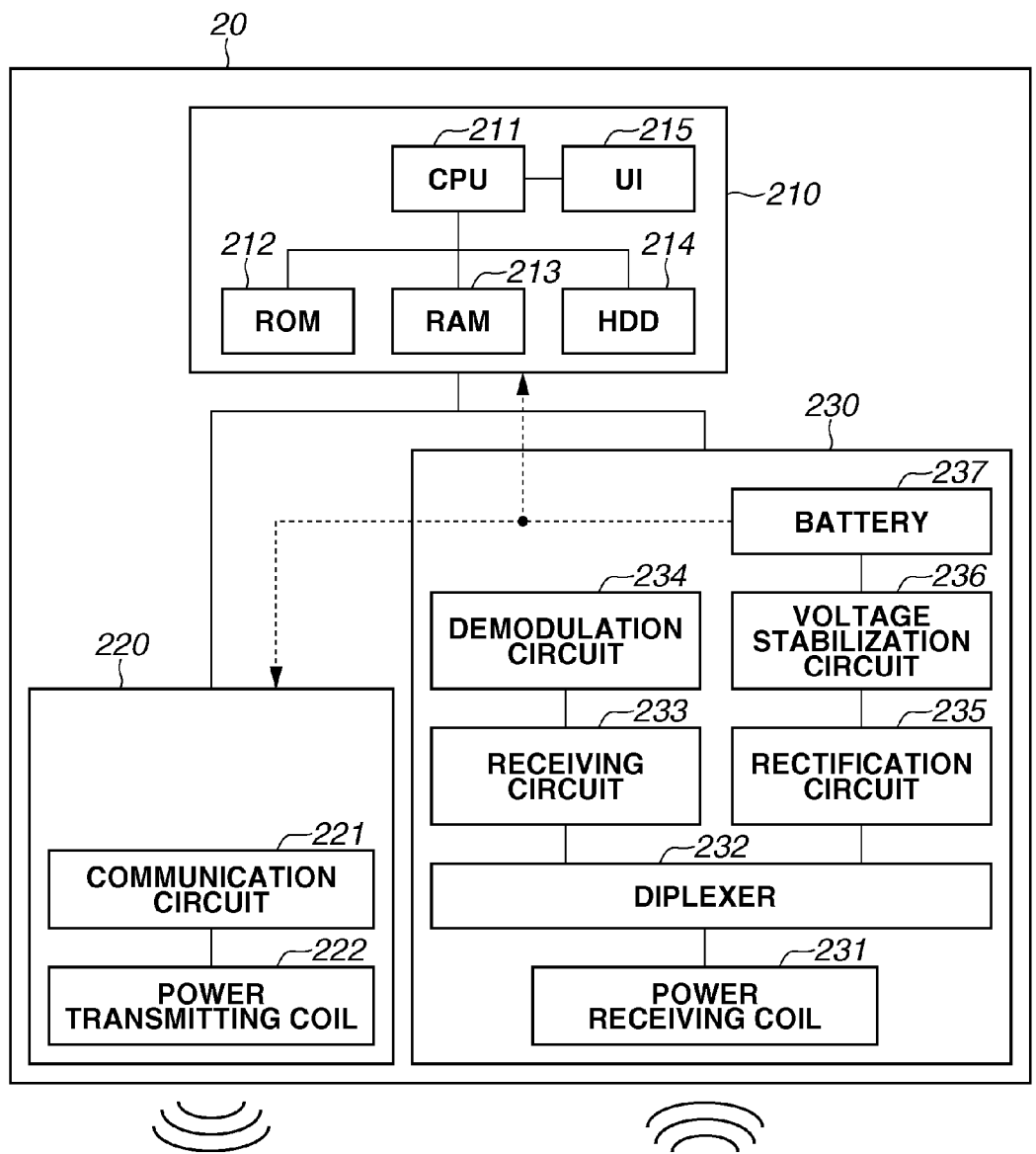
FIG. 3 illustrates a power receiving apparatus.

FIG. 3 illustrates a power receiving apparatus 20. Referring to FIG. 3, data exchange paths are illustrated by solid lines, and power supply paths are illustrated by dotted lines. The power receiving apparatus 20 includes a control unit 210, a wireless transmission unit 220, and a wireless reception unit 230. The control unit 210 controls the power receiving apparatus 20. The control unit 210 includes a CPU 211, a ROM 212, a RAM 213, a HDD 214, and a UI 215. The control unit 210 is connected with the wireless transmission unit 220 and the wireless reception unit 230 via internal buses.

The CPU 211 processes various data, and controls the power receiving apparatus 20. The ROM 212 is a nonvolatile storage medium for storing a boot program, etc. used for the CPU 211. The RAM 213 is a volatile storage medium for temporarily storing data programs used by the CPU 211. The HDD 214 is a nonvolatile storage medium for storing an operating system (OS) and applications used by the CPU 211. The UI 215 displays various information to the user, and receives various instructions from the user.

The wireless transmission unit 220 transmits data to the power transmitting apparatus 10. The wireless transmission unit 220 includes a communication circuit 221 and a power transmitting coil 222. The communication circuit 221 generates a modulation signal for communication. The power transmitting coil 222 transmits the modulation signal generated by the communication circuit 221 to the power transmitting apparatus 10.

The wireless reception unit 230 wirelessly receives the power from the power transmitting apparatus 10. The wireless reception unit 230 includes a receiving coil 231, a diplexer 232, a receiving circuit 233, a demodulation circuit 234, a rectification circuit 235, a voltage stabilization circuit 236, and a battery 237. The receiving coil 231 receives the modulation signal from the power transmitting apparatus 10. The diplexer 232 divides the modulation signal received by the receiving coil 231 into a modulation signal for communication and a modulation signal for power transmission. The receiving circuit 233 receives the modulation signal for communication generated through the division by the diplexer 232.

The demodulation circuit 234 demodulates the modulation signal of the receiving circuit 233. The rectification circuit 235 rectifies the modulation signal for power transmission generated through the division by the diplexer 232, to generate a DC voltage. The voltage stabilization circuit 236 stabilizes the DC voltage generated by the rectification circuit 235. The battery 237 receives the DC voltage stabilized by the voltage stabilization circuit 236, and accumulates the power. Based on the accumulated power, the battery 237 supplies the DC voltage to the control unit 210, the wireless transmission unit 220, and the wireless reception unit 230.

The function and processing of the power receiving apparatus 20 described below are implemented when the CPU 211 reads a relevant program stored in the ROM 212 or HDD 214, and executes it.

FIG. 4 illustrates wireless power supply processing based on the nuclear magnetic resonance method employed by the power transmitting apparatus 10 and the power receiving apparatus 20. A power transmitting unit 400 of the power transmitting apparatus 10 illustrated in FIG. 4A includes a power source 410, a capacitor 411 having an adjustable capacitance, and a coil 412. The power transmitting unit 400 changes the capacitance of the capacitor 411 to match the resonance frequencies of the power receiving apparatus 20 and the relevant power transmitting apparatus 10, and transmits the power.

On the other hand, the power receiving unit 420 of the power receiving apparatus 20 includes a coil 421, a capacitor 422 having an adjustable capacitance, a diode 423, and a load resistor 424. The power receiving unit 420 changes the capacitance of the capacitor 422 to match the resonance frequencies of the power transmitting apparatus 10 and the relevant power receiving apparatus 20, and receives the supplied power.

The diode 423 and the load resistor 424 function as the rectification circuit 235 (see FIG. 3). In other words, the diode 423 and the load resistor 424 rectify the AC power received from the power transmitting apparatus 10 to convert it into the DC power for use as the internal power.

FIG. 4B illustrates examples of a resonance frequency fb of the power transmitting apparatus 10, and a resonance frequency fd of the power receiving apparatus 20. As described above, when the resonance frequencies fb and fd are matched, the power transmitting apparatus 10 can transmit the power with higher efficiency.

Figure 5:
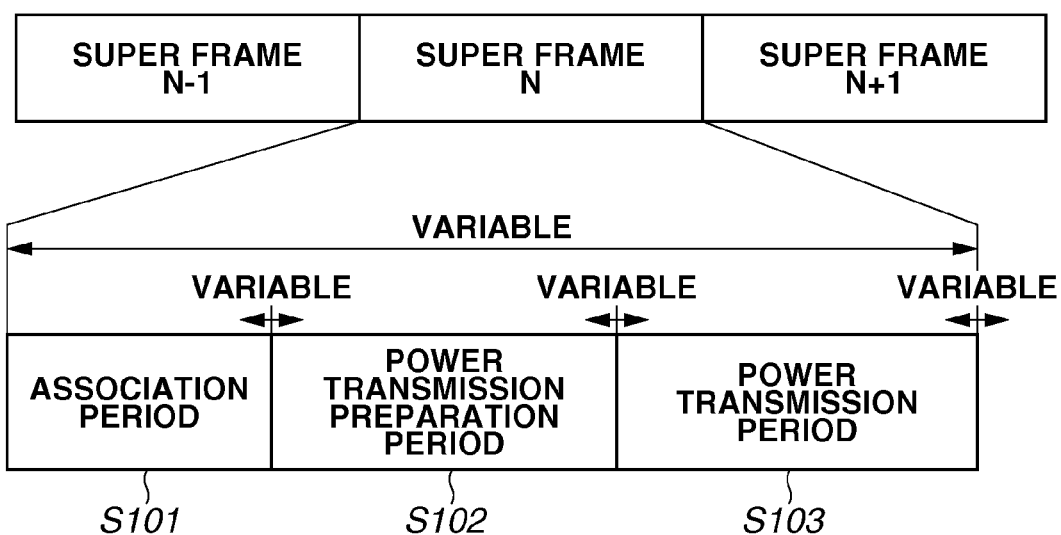
FIG. 5 illustrates an example of a super frame.

FIG. 5 illustrates an example of a super frame. The wireless power supply system according to the present exemplary embodiment repeats such a super frame to perform the wireless power supply processing. One super frame includes the association period (step S101), the power transmission preparation period (step S102), and the power transmission period (step S103). Each period is variable.

In step S101, the power transmitting apparatus 10 confirms a device identifier (ID) and the necessity of the power on the power receiving apparatus 20. Upon reception of the device ID and notification of the necessity of the power from the power receiving apparatus 20, the power transmitting apparatus 10 advances the processing to step S102. The period of transition from step S101 to step S102 is also variable.

In step S102, the power receiving apparatus 20 can transmit a frame response and acknowledge upon data request from the power transmitting apparatus 10. The length of each response frame and each acknowledge frame is variable. Upon completion of step S102, the power transmitting apparatus 10 advances the processing to step S103. The period of transition from step S102 to step S103 is also variable.

In step S103, the power transmitting apparatus 10 transmits the power to the power receiving apparatus 20. In step S103, even if the power receiving apparatus 20 does not receive a request frame from the power transmitting apparatus 10, the power receiving apparatus 20 can transmit a frame to the power transmitting apparatus 10.

Figure 6:
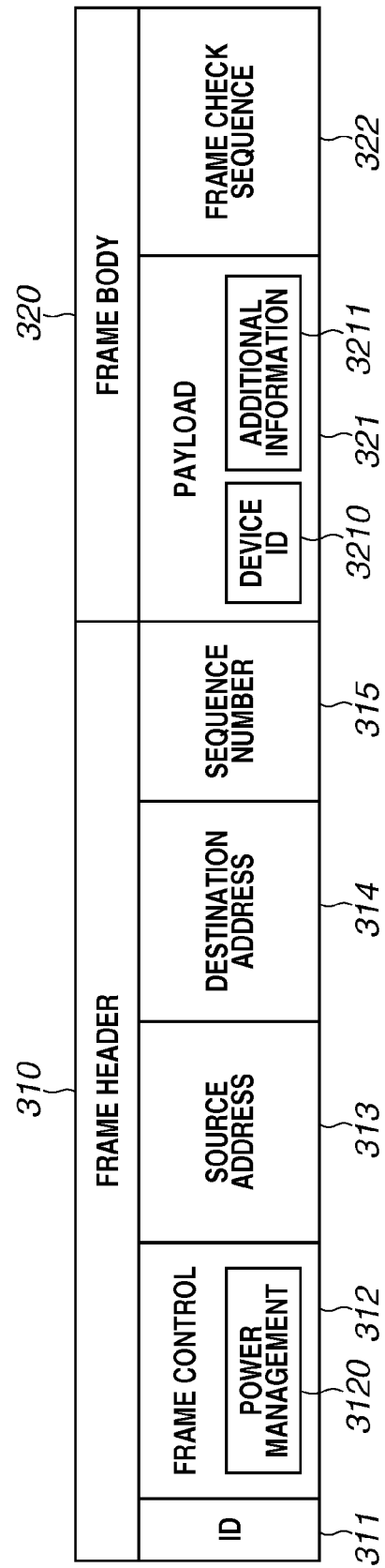
FIG. 6 illustrates an example of a frame format.

FIG. 6 illustrates an example of a frame format. The above-described super frame achieves data communication by using packets having a frame format as illustrated in FIG. 6. In this data communication, data exchange required to start wireless power supply is performed between the apparatuses.

A frame header 310 indicates a data transmission destination. The frame header 310 includes an ID 311, a frame control 312, a source address 313, a destination address 314, and a sequence number 315. The ID 311 is used when data communication is performed in the wireless power supply system.

The frame control 312 is information for data exchange with the power receiving apparatuses 20. The frame control 312 includes a power management 3120. The power management 3120 is data for confirming the necessity of the power. The source address 313 is the address of a source at the time of data transmission. The destination address 314 is the address of a destination at the time of data transmission. The sequence number 315 is the frame number.

A frame body 320 is information about a main data unit at the time of data transmission. The frame body 320 includes a payload 321 and a frame check sequence 322. The payload 321 is a main data unit. The payload 321 is assigned, for example, a device ID 3210 and additional information 3211. When the power transmitting apparatus 10 is currently supplying the power, the additional information 3211 includes at least information about the resonance frequency currently being used. The frame check sequence 322 is data for performing error check of the payload 321.

Figure 7:
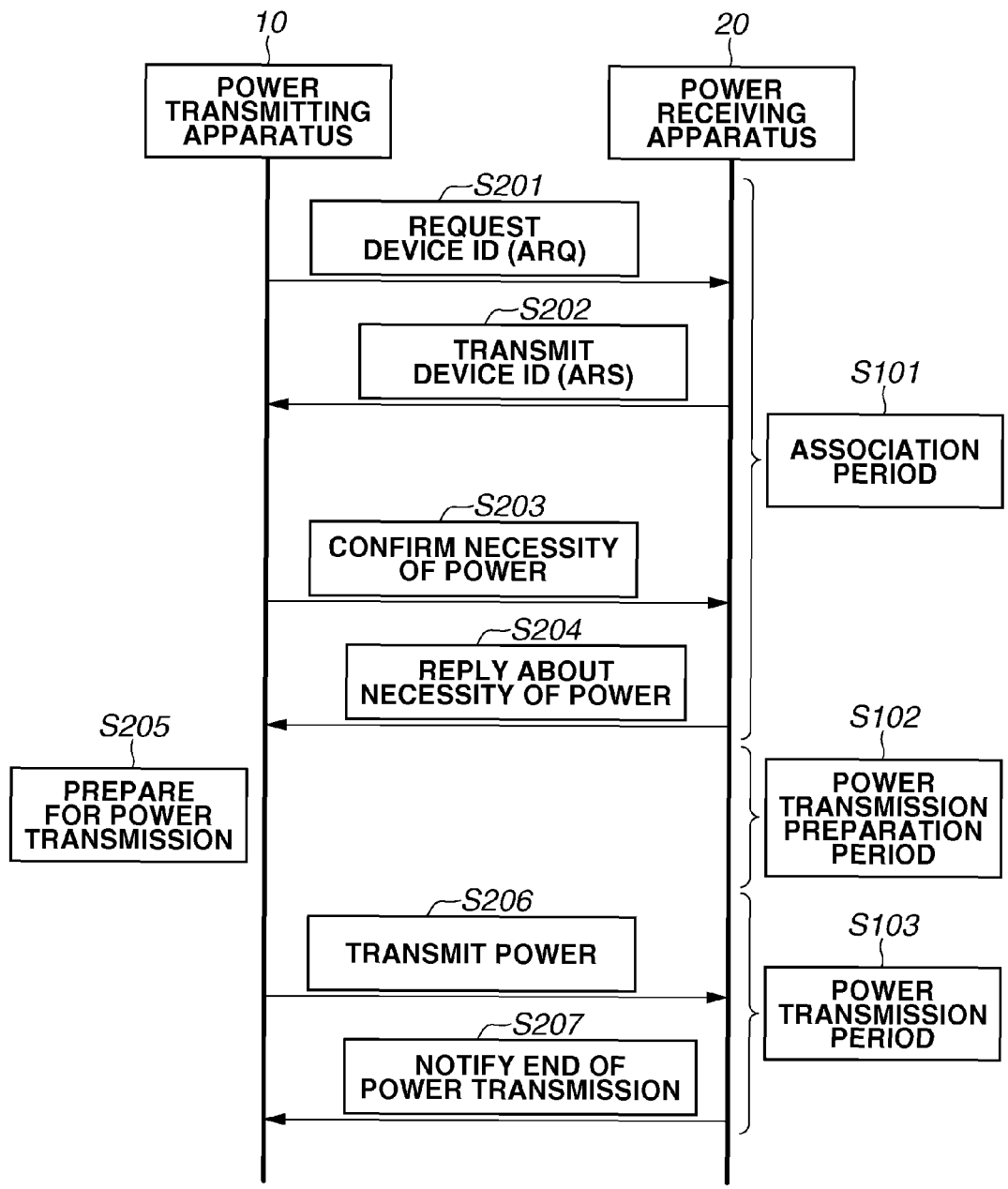
FIG. 7 is a sequence diagram illustrating processing based on the super frame.

FIG. 7 is a sequence diagram illustrating processing for data exchange between the power transmitting apparatus 10 and the power receiving apparatus 20 based on the super frame (data exchange processing). In step S201, the power transmitting apparatus 10 transmits an ARQ signal for requesting the device ID from the power receiving apparatus 20. In this case, the ID 311 of the frame format is used.

In step S202, the power transmitting apparatus 10 receives an Automatic Route Selection (ARS) signal including the device ID 3210 from the power receiving apparatus 20. In this case, the ID 311 of the frame format is used. In step S203, the power transmitting apparatus 10 confirms the necessity of the power with the power receiving apparatus 20. In this case, the power management 3120 of the frame format is used. In step S204, if the power receiving apparatus 20 needs the power, the power receiving apparatus 20 notifies the power transmitting apparatus 10 of the necessity of the power. In this case, the power management 3120 of the frame format is used.

In step S204, if the power receiving apparatus 20 does not need the power, the power receiving apparatus 20 notifies the power transmitting apparatus 10 of the unnecessity of the power. In this case, the power management 3120 of the frame format is used. The power transmitting apparatus 10 determines a power receiving apparatus 20 as a power transmission target based on the result of response as to the necessity of the power reception. In step S205, the power transmitting apparatus 10 prepares for power transmission. In step S206, the power transmitting apparatus 10 transmits the power to the power receiving apparatus 20. In step S207, when the battery 237 has been fully charged, the power receiving apparatus 20 transmits a power transmission end notification to the power transmitting apparatus 10. In this case, the power management 3120 of the frame format is used. This completes processing for one super frame. As described above, by performing data exchange processing in a super frame, data communication can be realized for wireless power supply.

Figure 8:
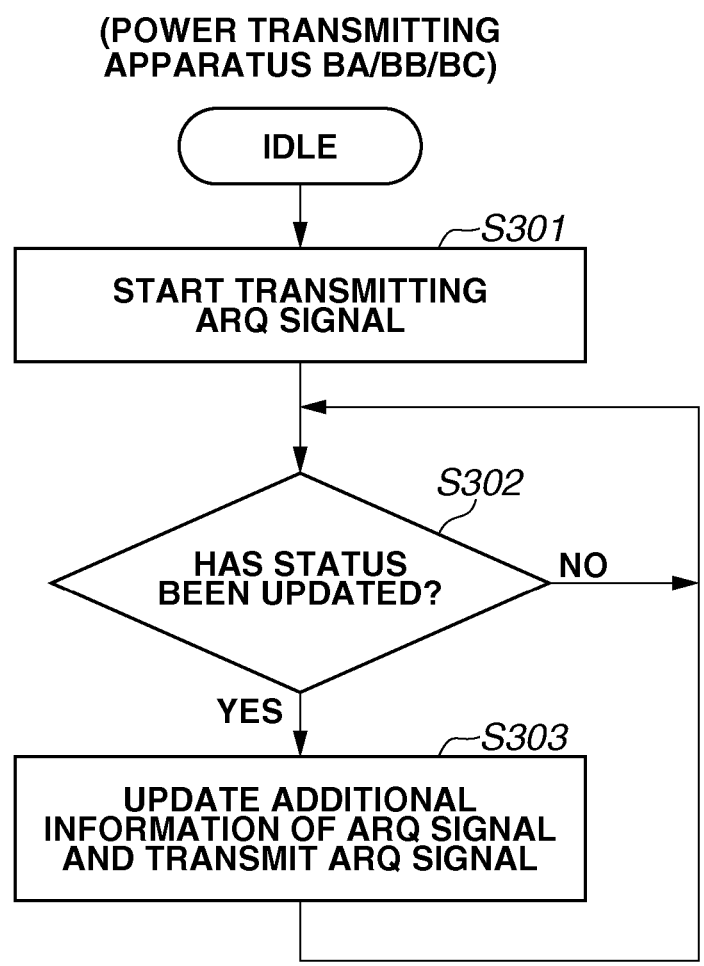
FIG. 8 is a flowchart illustrating resonance frequency notification processing.

The following describes resonance frequency control processing in power transmission by each power transmitting apparatus 10 in the wireless power supply system in a case where a plurality of power transmitting apparatuses 10 has mutually overlapping power supply areas 30. FIG. 8 is a flowchart illustrating resonance frequency notification processing performed by a plurality of power transmitting apparatuses 10.

In the resonance frequency notification processing, each power transmitting apparatus 10 periodically notifies other power transmitting apparatuses 10 of the resonance frequency information indicating the resonance frequency used for power transmission. The resonance frequency notification processing is performed in the ARQ signal transmission processing (step S201 in FIG. 7). The ARQ signal is a request signal used to transmit the power to the power receiving apparatus 20.

In step S301, when the power transmitting apparatus 10 shifts to the idle state after activation processing, it starts ARQ signal transmission on a broadcast basis. At this timing, the power transmitting apparatus 10 adds the resonance frequency currently being used to the additional information 3211 of the ARQ signal, and continuously transmits the ARQ signal at certain intervals. When the power transmitting apparatus 10 is not supplying the power, it sets a default value (for example, all 0s) to the value of the additional information 3211, and transmits the ARQ signal. The processing in step S301 is an example of transmission processing for transmitting the resonance frequency information.

In step S302, the power transmitting apparatus 10 determines whether the internal status of the power transmitting apparatus 10 itself has been updated. The internal status is updated, for example, when the power transmitting apparatus 10 starts or ends power transmission to the power receiving apparatus 20. Processing for updating the internal status will be described below. When the internal status has not been updated (NO in step S302), the power transmitting apparatus 10 continues ARQ signal transmission.

When the internal status has been updated (YES in step S302), then in step S303, the power transmitting apparatus 10 updates the resonance frequency information, and periodically transmits new ARQ information including the updated resonance frequency information.

Figure 9:
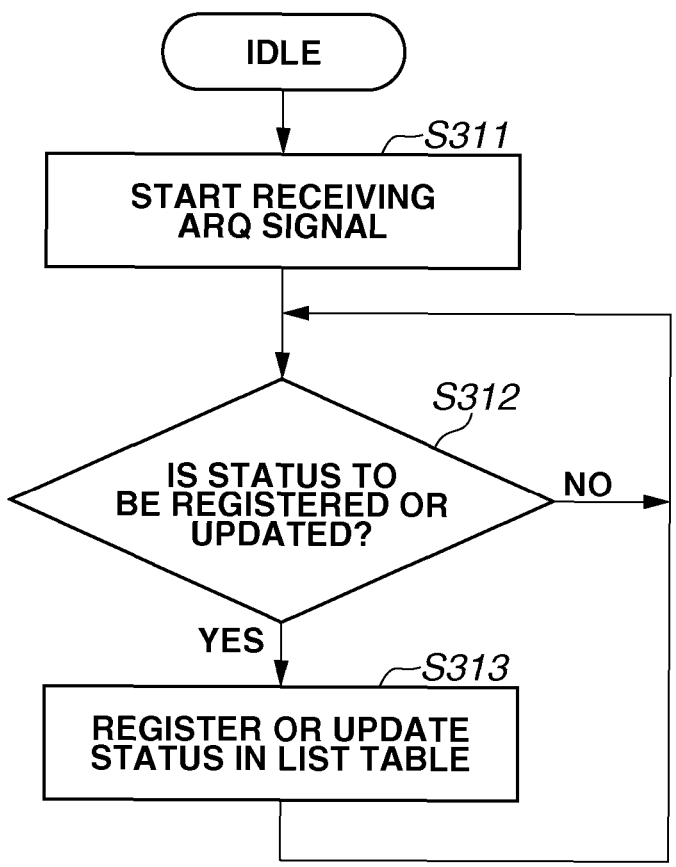
FIG. 9 is a flowchart illustrating Automatic Repeat reQuest (ARQ) signal reception processing.

FIG. 9 is a flowchart illustrating ARQ signal reception processing performed by a plurality of power transmitting apparatuses 10 and a certain power receiving apparatus 20. In the ARQ signal reception processing, each power transmitting apparatus 10 receives the resonance frequency information transmitted by other power transmitting apparatuses 10 in the resonance frequency notification processing (see FIG. 8). In step S311, when the power transmitting apparatus 10 shifts to the idle state after activation processing, similar to the power receiving apparatus 20, the power transmitting apparatus 10 starts receiving the ARQ signals transmitted from other power transmitting apparatuses 10. Processing in step S311 is an example of reception processing for receiving the resonance frequency information.

In step S312, the power transmitting apparatus 10 analyzes the contents of the received ARQ signal. Then, the power transmitting apparatus 10 compares the source address 313 and the additional information 3211 in the super frame with the contents of a relevant list stored in the list table to determine whether the relevant list in the list table is to be registered or updated.

The list table will be described below. The list table is stored in the RAM 113 or the HDD 114. FIG. 10 illustrates an example of the list table. A list table 601 stores a source address 602 in association with parameters 603 included in the additional information 3211. The CPU 111 of the power transmitting apparatus 10 registers the information included in the ARQ signal in the source address 602 and the parameters 603 in the list table 601. The parameters 603 includes the resonance frequency information.

Referring to FIG. 9 again, when the power transmitting apparatus 10 determines that the relevant list in the list table 601 is to be registered or updated (YES in step S312), then in step S313, the power transmitting apparatus 10 registers or updates the relevant list in the list table 601. Specifically, when the power transmitting apparatus 10 receives the ARQ signal from a new source, the power transmitting apparatus 10 additionally registers the source address 313 and the additional information 3211 (including the resonance frequency information) in the source address 602 and the parameters 603, respectively, in the list table 601.

When the contents of the additional information 3211 received from the source address 313 already registered in the source address 602 is different, the power transmitting apparatus 10 updates the contents of the parameters 603 registered.

On the other hand, when the power transmitting apparatus 10 determines that the relevant list in the list table 601 is to be neither registered nor updated (NO in step S312), the processing returns to step S311, and the power transmitting apparatus 10 continues ARQ signal reception.

Figure 11:
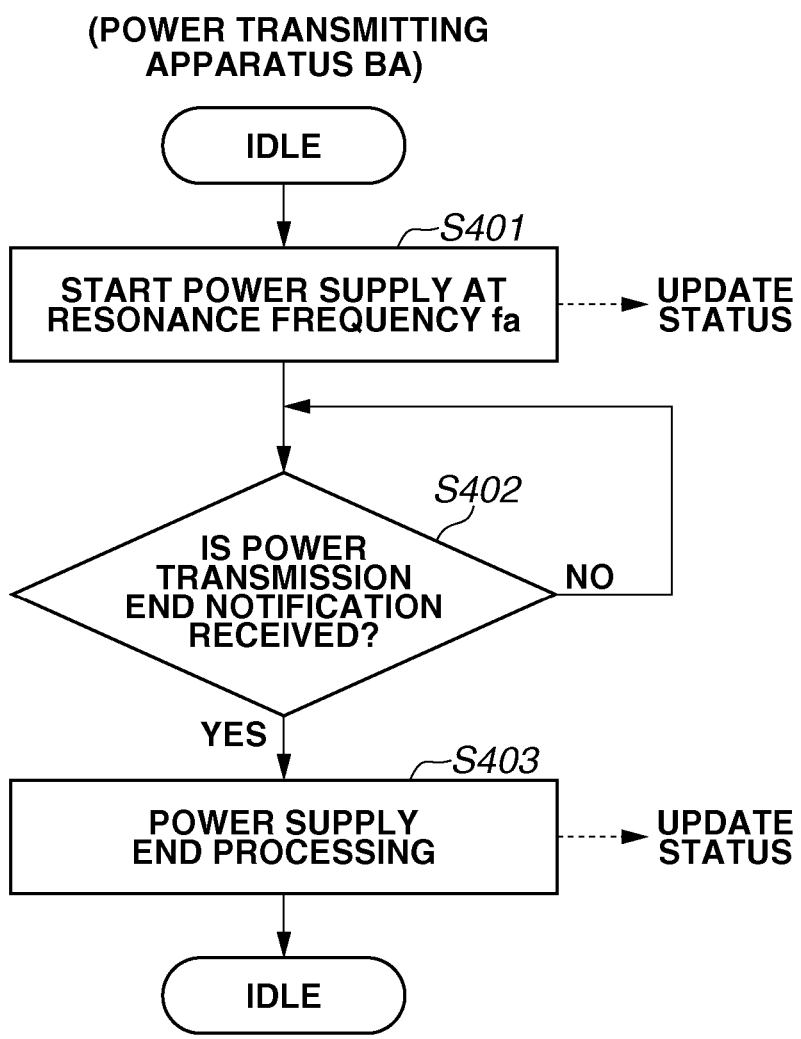
FIG. 11 is a flowchart illustrating first power transmission processing.

FIG. 11 is a flowchart illustrating first power transmission processing performed by a certain power transmitting apparatus 10. The first power transmission processing illustrated in FIG. 11 is performed by the power transmitting apparatus 10 when other power transmitting apparatuses 10 are not performing the power transmission processing. In step S401, the power transmitting apparatus 10 starts power supply to the power receiving apparatus 20 determined as a power transmission target, by using a resonance frequency fa (power transmission processing). The resonance frequency fa is, for example, a frequency requested from the power receiving apparatus 20. Then, when charging is completed, the power receiving apparatus 20 transmits the power transmission end notification to the power transmitting apparatus 10 (see step S207 in FIG. 7). In response to this processing, in step S402, the power transmitting apparatus 10 determines whether the power transmission end notification has been received from the power receiving apparatus 20.

When the power transmission end notification has not been received (NO in step S402), the power transmitting apparatus 10 continues power supply to the power receiving apparatus 20. On the other hand, when the power transmission end notification has been received (YES in step S402), then in step S403, the power transmitting apparatus 10 performs power supply end processing on the power receiving apparatus 20, and then exits this flowchart.

In the above processing, the power transmitting apparatus 10 starts power supply in step S401, and ends power supply in step S403. Therefore, in response to this processing, at the timings corresponding to steps S401 and S403 in the resonance frequency notification processing (see FIG. 8), the internal status of the power transmitting apparatus 10 is updated (YES in step S302). Accordingly, at the timings corresponding to steps S401 and S403, the power transmitting apparatus 10 updates the resonance frequency information, and transmits the ARQ signal including the updated resonance frequency information (step S303 in FIG. 8).

Figure 12:
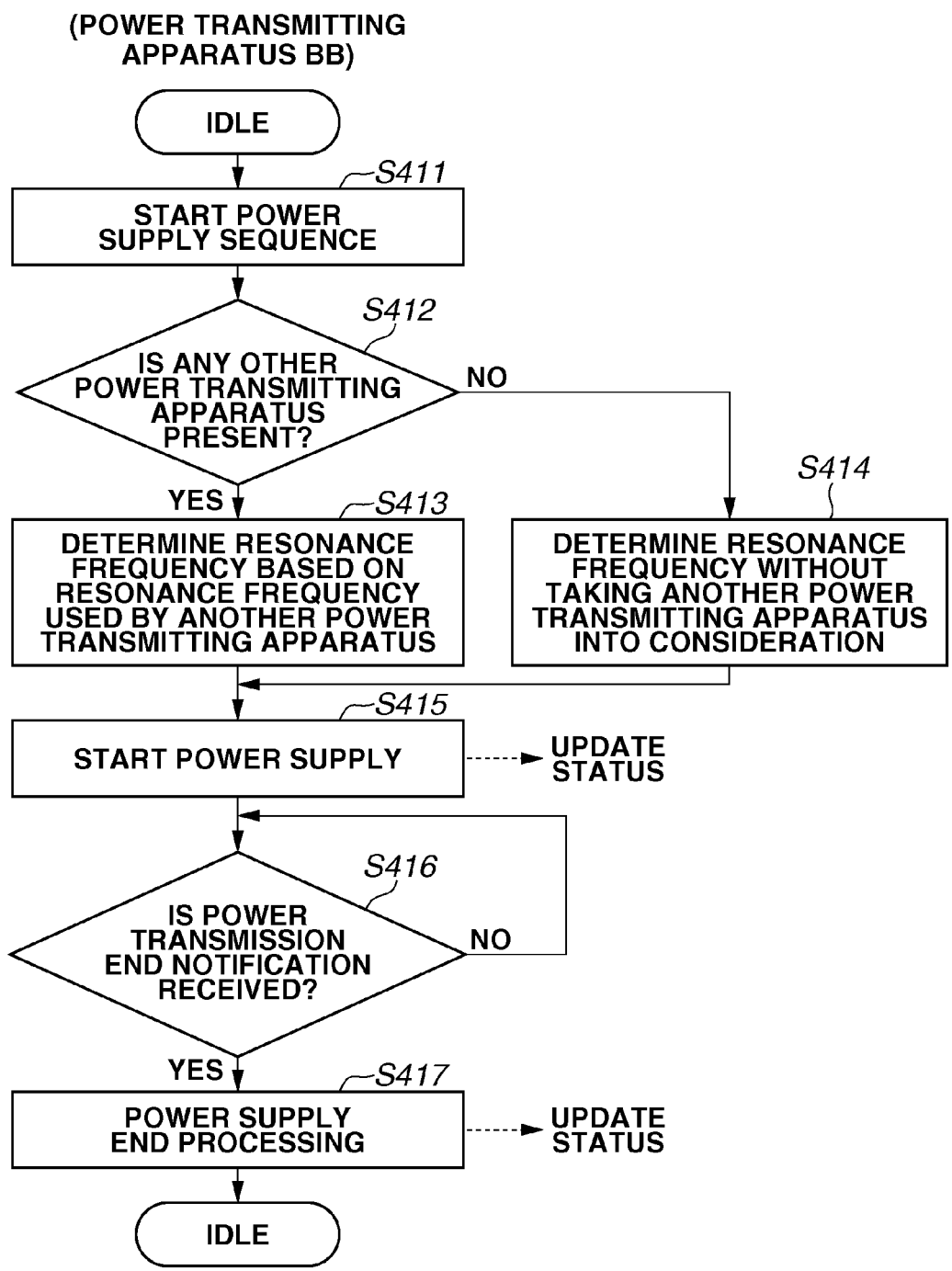
FIG. 12 is a flowchart illustrating second power transmission processing.

FIG. 12 is a flowchart illustrating second power transmission processing performed by a certain power transmitting apparatus 10. The second power transmission processing illustrated in FIG. 12 is performed when any one of other power transmitting apparatuses 10 is performing the first power transmission processing or the second power transmission processing. In step S411, the power transmitting apparatus 10 starts the power supply sequence in communication with the power receiving apparatus 20 which is a power transmission target In step S412, in resonance frequency adjustment in the power supply sequence, the power transmitting apparatus 10 determines whether there is any other power transmitting apparatus 10 currently transmitting the power, based on the list table 601. Specifically, the power transmitting apparatus 10 determines whether the resonance frequency information is stored in the parameters 603. When the resonance frequency information is stored therein, the power transmitting apparatus 10 determines that there is another power transmitting apparatus 10 currently transmitting the power.

When there is any other power transmitting apparatus 10 currently transmitting the power (YES in step S412), then in step S413, the power transmitting apparatus 10 determines a resonance frequency to be used by the power transmitting apparatus 10 itself, based on the resonance frequencies currently being used by other power transmitting apparatuses 10 (resonance frequency determination processing). Specifically, the power transmitting apparatus 10 determines as a resonance frequency to be used by the power transmitting apparatus 10 itself a resonance frequency different from the resonance frequencies currently being used by other power transmitting apparatuses 10.

A different resonance frequency means that the resonance frequency is sufficiently separated from the resonance frequencies currently being used, so that other power transmitting apparatuses 10 do not perform unintended power supply due to closeness to the currently used frequencies, to the power receiving apparatuses 20 which are power transmission targets. This can prevent each power transmitting apparatus 10 from performing unintended power supply to the power receiving apparatuses 20 other than the one set as a power reception target by the power transmitting apparatus 10.

As another example, if there is no available resonance frequency adjustable with the power receiving apparatus 20 as a power transmission target, the power transmitting apparatus 10 may wait until a resonance frequency currently being used becomes available. Then, when a resonance frequency currently being used becomes available, the power transmitting apparatus 10 starts power transmission to the power receiving apparatus 20 by using a desired resonance frequency.

Meanwhile, when there is no other power transmitting apparatus 10 currently transmitting the power (NO in step S412), then in step S414, the power transmitting apparatus 10 determines the resonance frequency without taking into consideration the resonance frequencies of other power transmitting apparatuses 10. Specifically, the power transmitting apparatus 10 determines as a resonance frequency to be used by the power transmitting apparatus 10 itself the resonance frequency requested by the power receiving apparatus 20.

In step S415, the power transmitting apparatus 10 starts power supply to the power receiving apparatus 20 as a power transmission target (power transmission processing). At that time, the power transmitting apparatus 10 transmits the power to the power receiving apparatus 20 by using the resonance frequency determined in step S413 or S414.

In step S416, the power transmitting apparatus 10 determines whether the power transmission end notification has been received from the power receiving apparatus 20. The power transmission end notification is transmitted in step S207 in the data exchange processing (see FIG. 7). When the power transmission end notification has not been received (NO in step S416), the power transmitting apparatus 10 continues power supply to the power receiving apparatus 20. On the other hand, when the power transmission end notification has been received (YES in step S416), then in step S417, the power transmitting apparatus 10 ends power supply to the power receiving apparatus 20.

In the above processing, the power transmitting apparatus 10 starts power supply in step S415, and ends power supply in step S417. Therefore, in response to this processing, at the timings corresponding to steps S415 and S417 in the resonance frequency notification processing (see FIG. 8), the internal status of the power transmitting apparatus 10 is updated (YES in step S302). Accordingly, at the timings corresponding to steps S415 and S417, the power transmitting apparatus 10 updates the resonance frequency information, and transmits the ARQ signal including the updated resonance frequency information (step S303 in FIG. 8).

Figure 13:
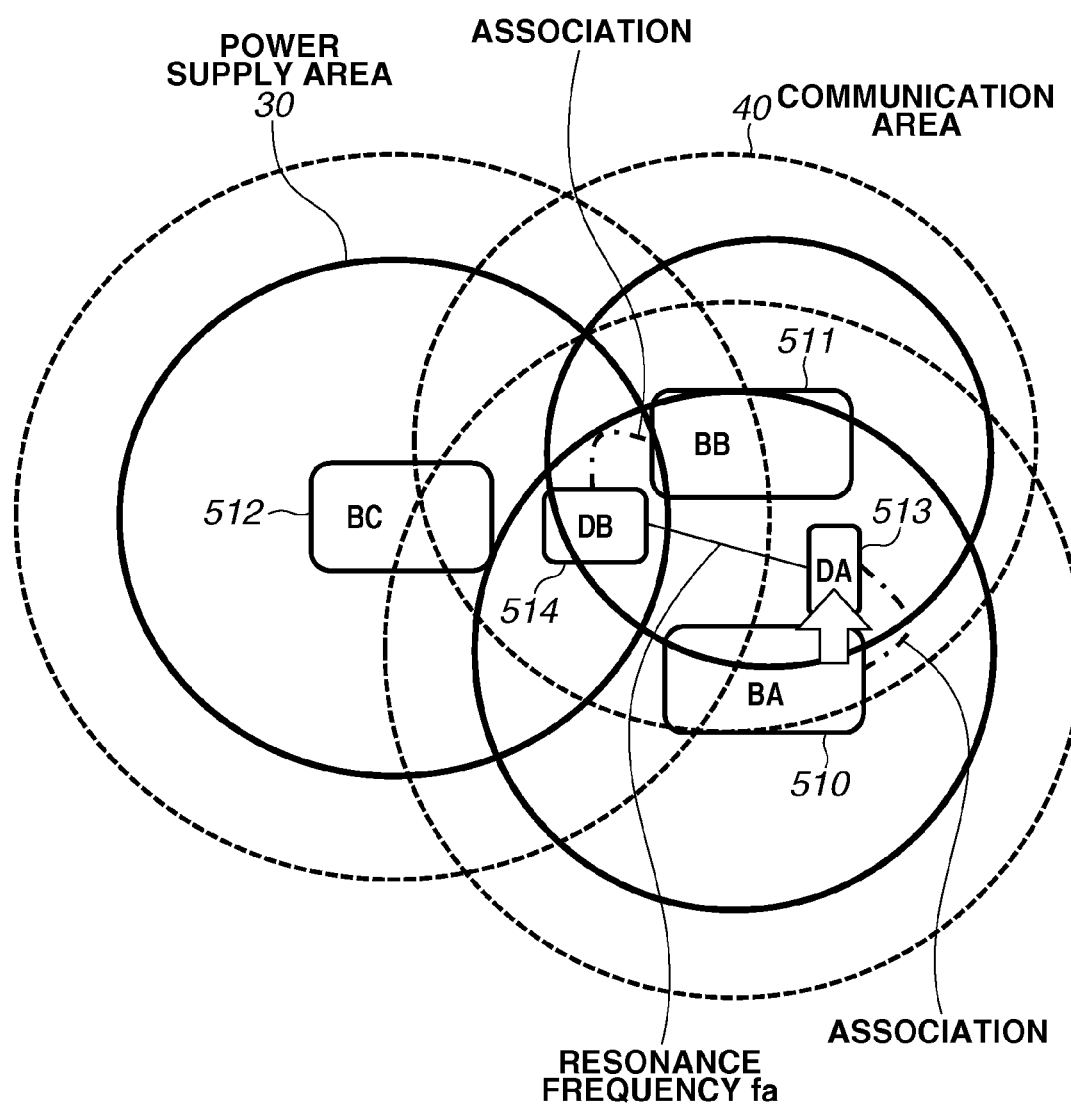
FIG. 13 illustrates an example of arrangement between a plurality of power transmitting apparatuses.

The resonance frequency notification processing, the ARQ signal reception processing, and the power transmission processing will be described in more detail below with reference to an example illustrated in FIG. 13. FIG. 13 illustrates an example of arrangement between three power transmitting apparatuses 10.

In this example, the three power transmitting apparatuses 10 (a power transmitting apparatus BA 510, a power transmitting apparatus BB 511, and a power transmitting apparatus BC 512) are disposed in close vicinity, so that the communication areas 40 and the power supply areas 30 of the power transmitting apparatus BA 510, the power transmitting apparatus BB 511, and the power transmitting apparatus BC 512 overlap with each other.

Then, in the association period, the power transmitting apparatus BA 510 determines the power receiving apparatus 20 (the power receiving apparatus DA 513) as a power transmission target, and starts power supply to the power receiving apparatus DA 513 by using the resonance frequency fa.

Further, the power receiving apparatus 20 (the power receiving apparatus DB 514) is assumed to have been brought into the power supply areas 30 of the power transmitting apparatus BA 510, the power transmitting apparatus BB 511, and the power transmitting apparatus BC 512 while the power transmitting apparatus BA 510 is supplying the power to the power receiving apparatus DA 513. Further, the power transmitting apparatus BB 511 is assumed to have determined the power receiving apparatus DB 514 as a power transmission target.

In this case, if the power transmitting apparatus BB 511 starts power transmission with a frequency close to or identical to the resonance frequency fa, the power from power transmitting apparatus BB 511 may also be supplied to the power receiving apparatus DA 513. Meanwhile, the power from the power transmitting apparatus BA 510 may also be supplied to the power receiving apparatus DB 514. As described above, the power may be supplied to a power receiving apparatus 20 which is not a power transmission target of the power transmitting apparatus BA 510.

Accordingly, in the wireless power supply system according to the present exemplary embodiment, in this case, processing for using different resonance frequencies is performed when supplying power to the power receiving apparatuses DA 513 and the power receiving apparatus DB 514.

Specifically, in the resonance frequency notification processing (see FIG. 8), each of the power transmitting apparatuses 10 (the power transmitting apparatus BA 510, the power transmitting apparatus BB 511, and the power transmitting apparatus BC 512) notify other power transmitting apparatuses 10 of the resonance frequency currently being used by the power transmitting apparatus 10 itself. In the ARQ signal reception processing (see FIG. 9), all of the power transmitting apparatuses 10 receive the information about the resonance frequencies currently being used by other power transmitting apparatuses 10.

In step S401, the power transmitting apparatus BA 510 performs the first power transmission processing (see FIG. 11), and starts power transmission to the power receiving apparatus DA 513 by using the resonance frequency fa. In step S403, the power transmitting apparatus BA 510 continues power transmission until it receives the power transmission end notification from the power receiving apparatus DA 513, and, upon reception of the power transmission end notification, ends power transmission.

In response to this processing, at the timing corresponding to step S401 in the resonance frequency notification processing, the power transmitting apparatus BA 510 transmits the resonance frequency information indicating the resonance frequency fa. At the timing corresponding to step S406 in the resonance frequency notification processing, the power transmitting apparatus BA 510 transmits the resonance frequency information indicating the default value.

To newly start power transmission, the power transmitting apparatus BB 511 performs second power transmission processing (see FIG. 12). At this timing, the power transmitting apparatus BA 510 is currently transmitting the power to the power receiving apparatus DA 513. In this case, the source address of the power transmitting apparatus BA 510 and the resonance frequency fa currently being used are stored in the list table 601 of the power transmitting apparatus BB 511 (YES in step S412). In step S413, therefore, the power transmitting apparatus BB 511 determines as a resonance frequency to be used by the power transmitting apparatus BB 511 itself the resonance frequency fb different from the resonance frequency fa.

In step S415, the power transmitting apparatus BB 511 starts power transmission to the power receiving apparatus DB 514 by using the resonance frequency fb. In step S417, the power transmitting apparatus BB 511 continues power transmission until it receives the power transmission end notification from power receiving apparatus DB 514, and, upon reception of the power transmission end notification, ends power transmission.

In response to this processing, at the timing corresponding to step S415 in the resonance frequency notification processing, the power transmitting apparatus BB 511 transmits the resonance frequency information indicating the resonance frequency fb. At the timing corresponding to step S417 in the resonance frequency notification processing, the power transmitting apparatus BB 511 further transmits the resonance frequency information indicating the default value.

As described above, in the wireless power supply system according to the present exemplary embodiment, each power transmitting apparatus 10 shares the information about the resonance frequency currently being used by the power transmitting apparatus 10 and unintended power supply to the power receiving apparatuses 20 can be avoided.

As an example of modification of the wireless power supply system according to the first exemplary embodiment, similar to the power transmitting apparatus 10, the power receiving apparatus 20 may receive the ARQ signal and store it in the list table 601. In this case, the power receiving apparatus 20 stores the list table 601 in the storage unit, such as the RAM 213 and the HDD 214. Then, the power receiving apparatus 20 performs the ARQ signal reception processing (see FIG. 9), and further determines a resonance frequency to be used for power reception processing based on the resonance frequencies currently being used (resonance frequency determination processing). The power receiving apparatus 20 does not perform the power reception processing by using resonance frequencies other than the determined resonance frequency.

The power receiving apparatus 20 may notify the power transmitting apparatus 10 of the determined resonance frequency as a desired frequency. As described above, not only the power transmitting apparatus 10 but also the power receiving apparatus 20 can share the information about the resonance frequency currently being used by the power transmitting apparatus 10.

In a wireless power supply system according to a second exemplary embodiment, additional information is exchanged between two power transmitting apparatuses 10. The wireless power supply system according to the second exemplary embodiment differs in this point from the wireless power supply system according to the first exemplary embodiment according to which each power transmitting apparatus 10 unilaterally transmits the ARQ signal including the additional information 3211.

In the wireless power supply system according to the present exemplary embodiment, a certain power transmitting apparatus 10 behaves as if it were a power receiving apparatus 20 in the association period of one of other power transmitting apparatuses 10, thus completing exchange of the additional information.

Figure 14:
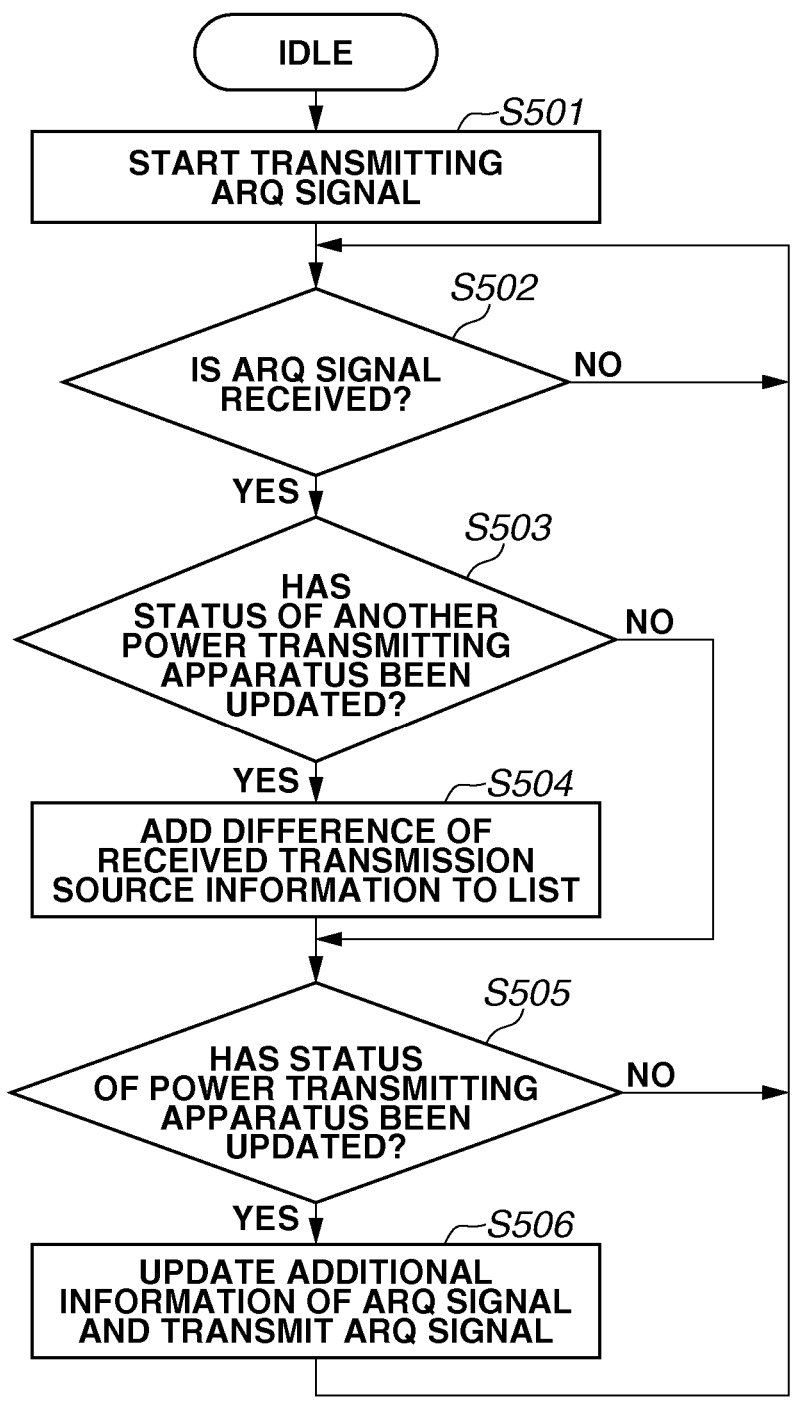
FIG. 14 is a flowchart illustrating another ARQ signal transmission processing.

FIG. 14 is a flowchart illustrating the ARQ signal transmission processing performed by a plurality of power transmitting apparatuses 10. In step S501, each power transmitting apparatus 10 starts ARQ signal transmission. In step S502, the power transmitting apparatus 10 waits for ARQ signal transmission from other power transmitting apparatuses 10. When the power transmitting apparatus 10 receives the ARQ signal (YES in step S502), the power transmitting apparatus 10 advances the processing to step S503. On the other hand, when the power transmitting apparatus 10 does not receive the ARQ signal (NO in step S502), the power transmitting apparatus 10 continuously waits for ARQ signal reception.

In step S503, based on the ARQ signal received in step S502, the power transmitting apparatus 10 determines whether the status of any one of other power transmitting apparatuses 10 has been updated. Specifically, the power transmitting apparatus 10 determines whether either the source address 313 or the additional information 3211 included in the ARQ signal has been updated.

When either the source address 313 or the additional information 3211 has been updated (YES in step S503), then in step S504, the power transmitting apparatus updates the list table 601 based on the difference between the information registered in the list table 601 and the information included in the ARQ signal. When neither the source address 313 nor the additional information 3211 has been updated (NO in step S503), the power transmitting apparatus 10 advances the processing to step S505.

In step S505, the power transmitting apparatus 10 determines whether the internal status of the power transmitting apparatus 10 itself has been updated. When the internal status has been updated (YES in step S505), the power transmitting apparatus 10 advances the processing to step S506. On the other hand, when the internal status has not been updated (NO in step S505), the power transmitting apparatus 10 returns the processing to step S502, and waits for ARQ signal reception. In step S506, the power transmitting apparatus 10 updates the contents of the additional information 3211, and continues ARQ signal transmission.

Figure 15:
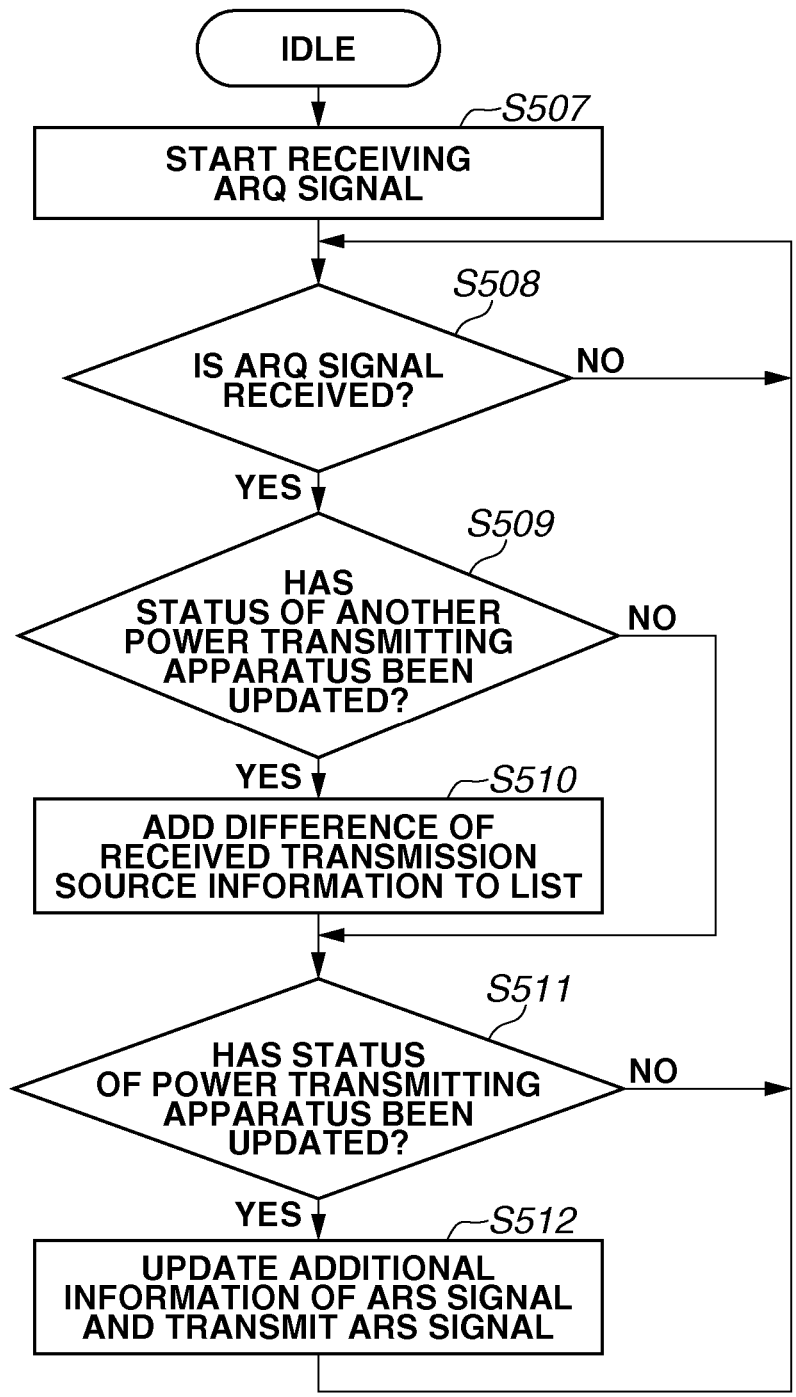
FIG. 15 is a flowchart illustrating still another ARQ signal reception processing.

FIG. 15 is a flowchart illustrating the ARQ signal reception processing performed by a plurality of power transmitting apparatuses 10. In the ARQ signal reception processing, each power transmitting apparatus 10 receives the ARQ signals transmitted by other power transmitting apparatuses 10 in the ARQ signal transmission processing (see FIG. 14). In step S507, the power transmitting apparatus 10 starts ARQ signal reception. In step S508, the power transmitting apparatus 10 waits for ARQ signal reception from other power transmitting apparatuses 10.

When the ARQ signal is received (YES in step S508), the power transmitting apparatus 10 advances the processing to step S509. On the other hand, when the ARQ signal is not received (NO in step S508), the power transmitting apparatus 10 continuously waits for ARQ signal reception.

In step S509, based on the ARQ signal received in step S508, the power transmitting apparatus 10 determines whether the status of any one of other power transmitting apparatuses 10 has been updated. Specifically, the power transmitting apparatus 10 determines whether either the source address 313 or the additional information 3211 included in the ARQ signal has been updated.

When either the source address 313 or the additional information 3211 (YES in step S509) has been undated, then in step S510, the power transmitting apparatus 10 updates the list table 601 based on the difference between the information registered in the list table 601 and the information included in the ARQ signal. When neither the source address 313 nor the additional information 3211 has been updated (NO in step S509), the power transmitting apparatus 10 advances the processing to step S511.

In step S511, the power transmitting apparatus 10 determines whether the internal status of the power transmitting apparatus 10 has been updated. When the internal status has been updated (YES in step S511), the power transmitting apparatus 10 advances the processing to step S512. On the other hand, when the internal status has not been updated (NO in step S511), the power transmitting apparatus 10 returns the processing to step S508, and waits for ARQ signal reception. In step S512, the power transmitting apparatus 10 updates the contents of the additional information 3211, and transmits the ARS signal as a response to the ARQ signal.

For example, in the example illustrated in FIG. 13, each of the power transmitting apparatus BA 510, the power transmitting apparatus BB 511, and the power transmitting apparatus BC 512 performs the ARQ signal transmission processing (see FIG. 14) and the ARQ signal reception processing (see FIG. 15).

As described above, in the wireless power supply system according to the second exemplary embodiment, the power transmitting apparatuses 10 can mutually confirm and share the resonance frequency information. This enables preventing each power transmitting apparatus 10 from performing unintended power supply to the power receiving apparatuses 20.

Other configuration and processing of the wireless power supply system according to the second exemplary embodiment are similar to those of the wireless power supply system according to the first exemplary embodiment.

In a wireless power supply system according to the third exemplary embodiment, based on the distances between the power transmitting apparatus 10 itself and other power transmitting apparatuses 10 calculated by the propagation distance calculation circuit 136, each power transmitting apparatus 10 determines a resonance frequency to be used for power transmission to the power receiving apparatus 20 as a power transmission target.

Each power transmitting apparatus 10 according to the third exemplary embodiment stores as the parameters 603 in the list table 601 distance information indicating the distance between the power transmitting apparatuses 10, together with the resonance frequency information. The list table 601 further stores power supply area information of other power transmitting apparatuses 10 in association with the source address 602 of each power transmitting apparatus 10. Each power transmitting apparatus 10 is configured to append the power supply area information of the power transmitting apparatus 10, for example, to the ARQ signal. Each power transmitting apparatus 10 acquires the power supply area information from other power transmitting apparatuses 10, and registers the relevant information in the list table 601.

Figure 16:
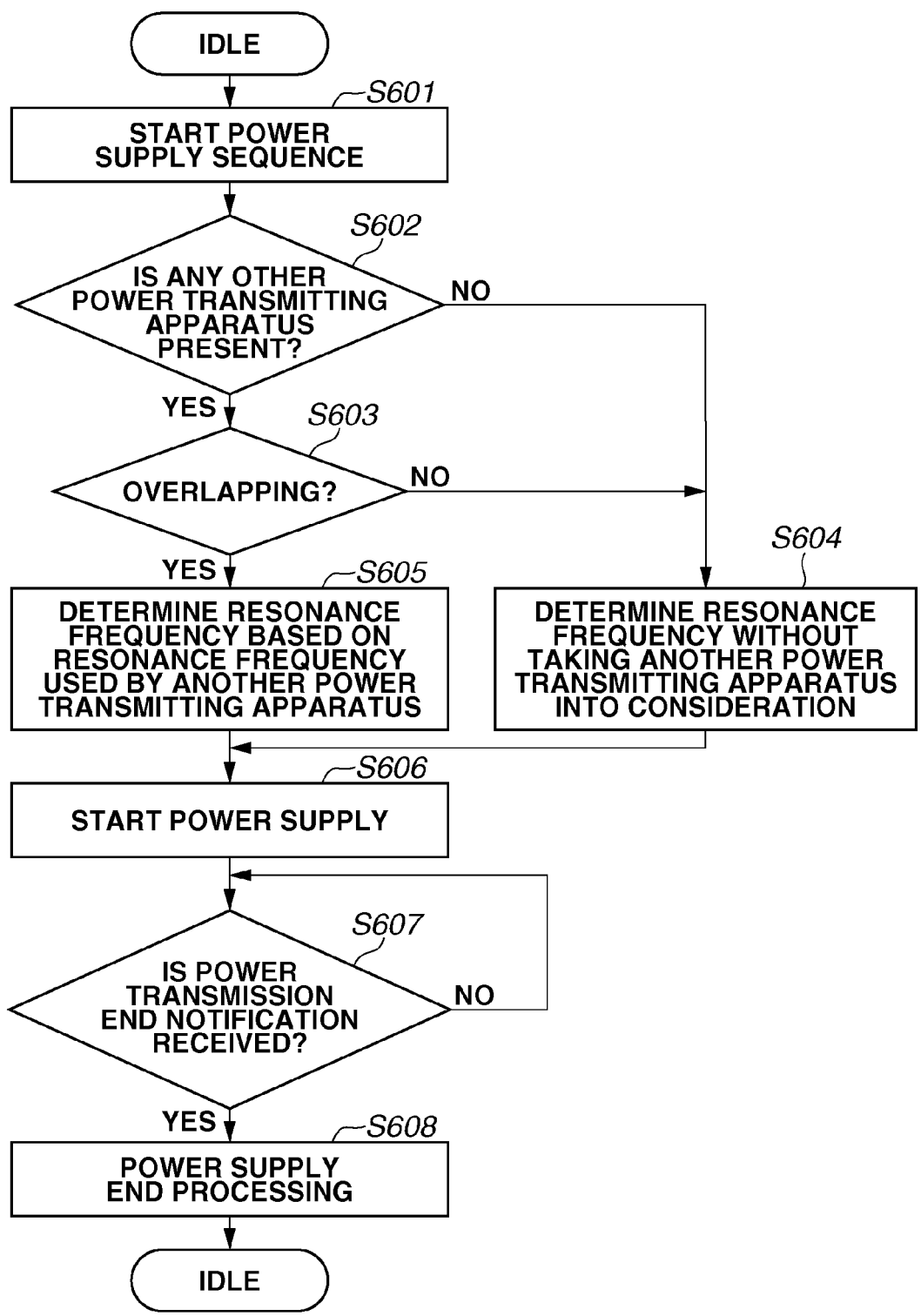
FIG. 16 is a flowchart illustrating second power transmission processing.

FIG. 16 is a flowchart illustrating the second transmitting processing performed by a certain power transmitting apparatus 10 according to the third exemplary embodiment. In step S601, the power transmitting apparatus 10 starts the power supply sequence with the power receiving apparatus 20 as a power transmission target. In step S602, in resonance frequency adjustment in the power supply sequence process, the power transmitting apparatus 10 determines whether there is any other power transmitting apparatus 10 currently transmitting the power, based on the list table 601.

When there is any other power transmitting apparatus 10 currently transmitting the power (YES in step S602), the power transmitting apparatus 10 advances the processing to step S603. On the other hand, when there is no other power transmitting apparatus 10 currently transmitting the power (NO in step S602), the power transmitting apparatus 10 advances the processing to step S604.

In step S603, the power transmitting apparatus 10 identifies the distances between the power transmitting apparatus 10 itself and other power transmitting apparatuses 10 calculated by the propagation distance calculation circuit 136 (distance identification processing). Then, based on the power supply area information of other power transmitting apparatuses 10 stored in the list table 601, the power transmitting apparatus 10 determines whether the power supply area of the power transmitting apparatus 10 overlaps with the power supply area of any one of other power transmitting apparatuses 10. When the power supply area of the power transmitting apparatus 10 overlaps with the power supply area of any one of other power transmitting apparatuses 10 (YES in step S603), the power transmitting apparatus 10 advances the processing to step S605. In step S605, based on the resonance frequency currently being used by the other power transmitting apparatus 10 having an overlapping power supply area, the power transmitting apparatus 10 determines a resonance frequency to be used by the power transmitting apparatus 10 (resonance frequency determination processing), and advances the processing to step S606.

On the other hand, when the power supply area of the power transmitting apparatus 10 overlaps with none of the power supply areas of other power transmitting apparatuses 10 (NO in step S603), the power transmitting apparatus 10 advances the processing to step S604. In step S604, the power transmitting apparatus 10 determines the resonance frequency without taking into consideration the resonance frequencies of other power transmitting apparatuses 10, and advances the processing to step S606. Processing in steps S606 to S608 is similar to processing in steps S415 to S417 in the second transmitting processing (see FIG. 12) described in the first exemplary embodiment.

Figure 17:
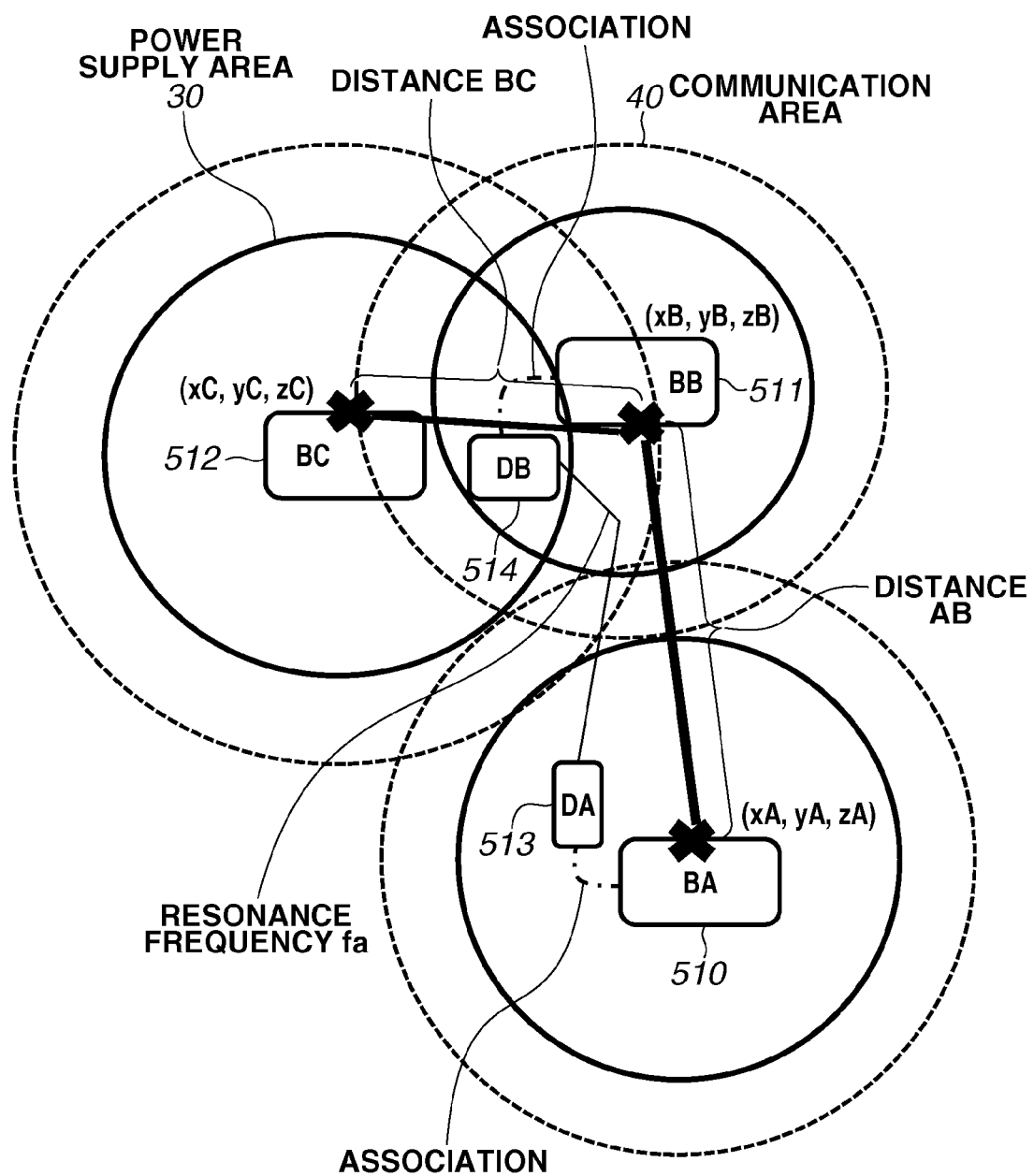
FIG. 17 illustrates an example of another arrangement between the plurality of power transmitting apparatuses.

The second power transmission processing will be described in more detail below with reference to an example illustrated in FIG. 17. FIG. 17 illustrates an example of another arrangement between the three power transmitting apparatuses 10. As described above, out of the three power transmitting apparatuses 10, the power supply area of power transmitting apparatus BB 511 is configured to overlap with the power supply area of power transmitting apparatus BC 512.

On the other hand, the power supply area of the power transmitting apparatus BA 510 overlaps with none of the power supply areas of the power transmitting apparatus BB 511 and the power transmitting apparatus BC 512. However, the communication areas of the power transmitting apparatus BA 510, the power transmitting apparatus BB 511, and the power transmitting apparatus BC 512 are configured to overlap with each other.

As described above, the power supply areas of the power transmitting apparatus BA 510 and the power transmitting apparatus BB 511 do not overlap with each other. Therefore, when the power transmitting apparatus BB 511 newly starts power transmission to the power receiving apparatus DB 514 while the power transmitting apparatus BA 510 is supplying the power to the power receiving apparatus DA 513, the power transmitting apparatus BB 511 can use the resonance frequency currently being used by the power transmitting apparatus BA 510.

Specifically, in the second power transmission processing (see FIG. 14), the power transmitting apparatus BB 511 starts power supply to the power receiving apparatus DB 514. In step S601, the power transmitting apparatus BB 511 starts the power supply sequence with the power receiving apparatus DB 514. In step S603, the power transmitting apparatus BB 511 refers to the list table 601.

At this timing, the list table 601 of the power transmitting apparatus BB 511 stores power supplying area information of the power transmitting apparatus BA 510 and the power transmitting apparatus BC 512. The list table 601 further stores distance information indicating the distance AB between the power transmitting apparatus BA 510 and the power transmitting apparatus BB 511, and distance information indicating the distance BC between the power transmitting apparatus BC 512 and the power transmitting apparatus BB 511.

Based on these pieces of information stored in the list table 601, the power transmitting apparatus BB 511 determines whether the power supply area of the power transmitting apparatus BA 510 overlaps with the power supply area of the power transmitting apparatus BB 511.

In the example illustrated in FIG. 17, since there is no overlapping area portion (NO in step S603), then in step S604, the power transmitting apparatus BB 511 determines a resonance frequency to be used by the power transmitting apparatus BB 511 without taking into consideration the resonance frequency fa to be used by the power transmitting apparatus BA 510. Thus, for example, the power transmitting apparatus BB 511 can also determine the resonance frequency fa as a target resonance frequency.

On the other hand, in the arrangement illustrated in FIG. 13, when the power supply area of the power transmitting apparatus BA 510 overlaps with the power supply area of the power transmitting apparatus BB 511 (YES in step S603), then in step S605, the power transmitting apparatus BB 511 determines a resonance frequency to be used by the power transmitting apparatus BB 511, based on the resonance frequency fa currently being used by the power transmitting apparatus BA 510. Specifically, the power transmitting apparatus BB 511 determines as a resonance frequency to be used by the power transmitting apparatus BB 511 the resonance frequency fb different from the resonance frequency fa.

As described above, in the wireless power supply system according to the third exemplary embodiment, each power transmitting apparatus 10 can determine the resonance frequency based on whether the power supply area of any one of other power transmitting apparatuses 10 overlaps with the power supply area of the power transmitting apparatus 10. This enables preventing each power transmitting apparatus 10 from performing unintended power supply to the power receiving apparatuses 20.

Other configuration and processing of the wireless power supply system according to the third exemplary embodiment are similar to those of the wireless power supply system according to other exemplary embodiments.

As an example of modification of the wireless power supply system according to the third exemplary embodiment, instead of the distances between each power transmitting apparatus 10 and other power transmitting apparatuses 10, each power transmitting apparatus 10 may store in the list table 601 positional information indicating the positions where respective power transmitting apparatuses 10 exist.

In the example illustrated in FIG. 17, the positional information (xA, yA, zA) for the power transmitting apparatus BA 510, the positional information (xB, yB, zB) for the power transmitting apparatus BB 511, and the positional information (xC, yC, zC) for the power transmitting apparatus BC 512 are stored in the list table 601 of each power transmitting apparatus 10.

In this case, in step S603 in the second power transmission processing (see FIG. 16), each power transmitting apparatus 10 calculates the distances between the power transmitting apparatus 10 and other power transmitting apparatuses 10 based on the positional information about each power transmitting apparatus 10. Then, the power transmitting apparatus 10 determines whether the power supply area of any one of other power transmitting apparatuses 10 overlaps with the power supply area of the power transmitting apparatus 10 based on the calculated distances and the power supply areas.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-064084 filed Mar. 26, 2013, which is hereby incorporated by reference herein in its entirety.

What is claimed is:

1. A power transmitting apparatus comprising:
a power transmitting coil that wirelessly supplies power to a power receiving apparatus by matching a resonance frequency of the power transmitting apparatus to a resonance frequency of the power receiving apparatus;
a storage medium; and
a central processing unit that executes instructions provided by the storage medium to:
determine whether another power transmitting apparatus that is supplying power is present when power supply to the power receiving apparatus is started; and
control, in a case where it is determined that the other power transmitting apparatus is present, the power transmitting coil so as to start power supply to the power receiving apparatus at a second resonance frequency different from a first resonance frequency that is being used by the other power transmitting apparatus, and control, in a case where it is determined that the other power transmitting apparatus is absent, the power transmitting coil so as to start power supply to the power receiving apparatus at a third resonance frequency requested by the power receiving apparatus.

* * * * *